United States Patent [19]

Heinzl et al.

[11] Patent Number: 4,888,598

[45] Date of Patent: Dec. 19, 1989

[54] INK WRITING HEAD WITH PIEZOELECTRICALLY EXCITABLE MEMBRANE

[75] Inventors: Joachim Heinzl, Munich; Manfred Lehmann, Puchheim; Gunter E. Trausch, Munich, all of Fed. Rep. of Germany

[73] Assignee: Siemens Aktiengesellschaft, Berlin and Munich, Fed. Rep. of Germany

[21] Appl. No.: 272,984

[22] PCT Filed: May 19, 1987

[86] PCT No.: PCT/DE87/00229

§ 371 Date: Oct. 11, 1988

§ 102(e) Date: Oct. 11, 1988

[87] PCT Pub. No.: WO87/07217

PCT Pub. Date: Dec. 3, 1987

[30] Foreign Application Priority Data

May 30, 1986 [DE] Fed. Rep. of Germany ....... 3618107

[51] Int. Cl.[4] ............................................ G01D 15/18

[52] U.S. Cl. .................................. 346/140 R; 346/11

[58] Field of Search ............................ 346/1.1, 140 R

[56] References Cited

U.S. PATENT DOCUMENTS 4,539,575 9/1985 Nilsson .

4,672,398 6/1987 Kuwabara et al. ............ 346/140 R

FOREIGN PATENT DOCUMENTS 0095911 5/1983 European Pat. Off. .

0145066 11/1984 European Pat. Off. .

1065880 9/1959 Fed. Rep. of Germany .

1165667 3/1964 Fed. Rep. of Germany .

1287135 1/1969 Fed. Rep. of Germany .

3320443 12/1984 Fed. Rep. of Germany .

58-112747 7/1983 Japan .

*Primary Examiner*—George H. Miller, Jr.

*Attorney, Agent, or Firm*—Hill, Van Santen, Steadman & Simpson

[57] ABSTRACT

An ink writing head comprising ink ejection channels and piezoelectric transducer elements allocated to the ink ejection channels, these transducer elements being supplied with writing fluid via supply lines, contains transducer elements comprising a first piezoelectrically excitable layer and a supporting layer firmly joined to the excitable layer. The piezoelectrically excitable layer comprises deflectable regions that are respectively subdivided into a peripheral and into a central region. For generating the needed excursion of the membrane, the regions of the membrane are driven such that the peripheral region is shortened, preferably by transversal contraction, and the central region is lengthened.

19 Claims, 3 Drawing Sheets

Figure 1:
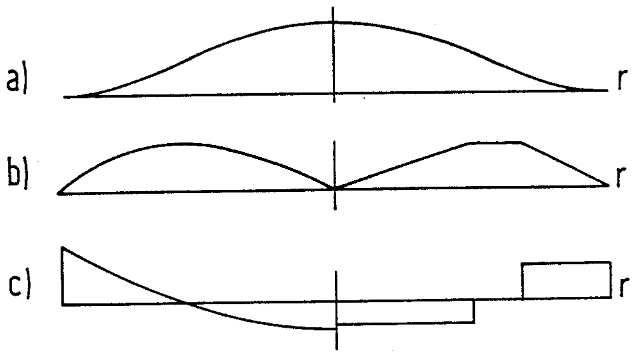

FIG 6
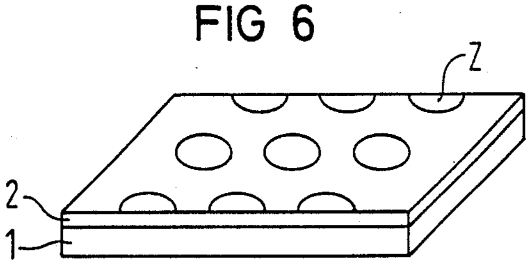
FIG 7
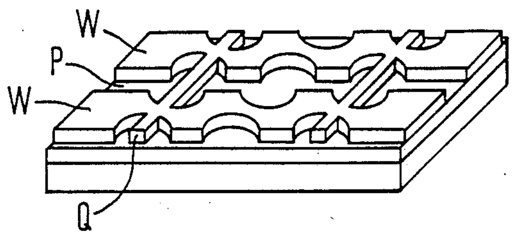
FIG 8
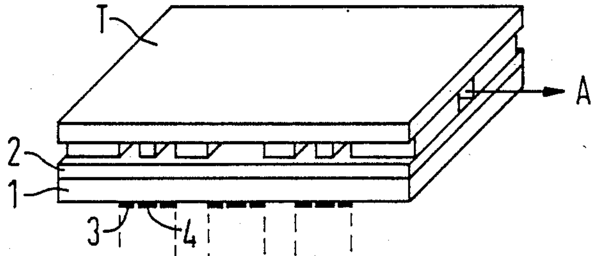
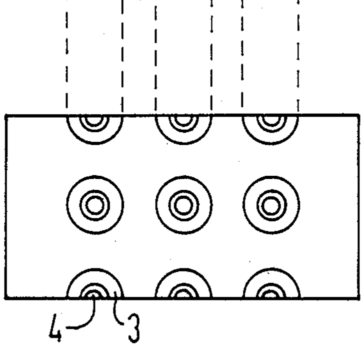
FIG 9

INK WRITING HEAD WITH PIEZOELECTRICALLY EXCITABLE MEMBRANE

The invention is directed to an in writing head and to a method for the manufacture of an ink writing head according to the preamble of patent claims 1 and 13.

Piezoelectrically operated drive elements in ink printers are generally known. Thus, German Published Application No. 21 64 614 discloses an arrangement in printing units for writing on paper with colored fluid wherein a fluid situated in an ink chamber is ejected from a printer jet via a piezoelectrically operated drive element. The volume change in the chamber is effected by an electrically driven piezoceramic that is seated on a metal plate and that arcs into the chamber. The employed piezo drive element is composed of a continuously polarized piezoceramic layer that is arranged on a metal plate, whereby the metal plate serves as cooperating electrode. When a suitable voltage pulse is applied, the piezoceramic constricts. Since the ceramic is secured to a metal plate, a bending moment acts on this plate. This results therein that the middle part of the plate arcs into the fluid chamber.

The length changes that can be directly piezoelectrically produced are disappearingly small. They are also limited by the electrical field strengths that dare be applied to the ceramic without this leading to punch-throughs or arc-overs. Further, the applied field strengths dare not lead to a re-polarization; they must also be switchable via appropriate drive circuits.

It is therefore standard to not exceed a voltage of about 200 V. The field strength should thereby be lower than 1 V/$\mu$m in the direction opposite the polarization. The distances between electrodes at air, moreover, should not be smaller than 1 $\mu$m/V. The direct length change that can be achieved in this way is thus about 0.1% or about 0.2 $\mu$m given a layer thickness of 200 $\mu$m, assuming that the ceramic is active through and through and is not partly inactive due, for instance, to a firing skin. In ink printing the drive elements, whether they are small piezo tubes or piezo laminae, are needed for a whole series of functions. They should accelerate controllably small ink quantities, eject them as droplets and replenish ink from a reservoir. If possible, however, they should also close the ejection openings in order to prevent the runout and the drying of the ink. Finally, the ink channels and the discharge openings should be capable of being cleaned and aerated with such elements.

Only a part of these functions are fully met in the known drive elements comprising acoustic drop formation. Sound waves in the ink channel can in fact form rapidly flying drops, but static pressure for eliminating impediments in the channel cannot be generated. Air inclusions in the ink channel limit the propagation of the pressure waves in the channel and channels that have emptied can only be refilled with an outside intervention. Given acoustic drop formation, the closure of the discharge openings can likewise only ensue mechanically from the outside.

It is therefore an object of the invention to fashion an ink head of the species initially cited such that, first, it can be simply manufactured in a galvanoplastic method and that, second, it exhibits a high degree of efficiency.

In an apparatus of the species initially cited, this object is achieved in accord with the characterizing part of the first patent claim.

Advantageous embodiments of the invention are characterized in the subclaims.

An especially large stroke derives in that the membrane comprises a piezoelectrically excitable peripheral region and a piezoelectrically excitable central region that are driven such for producing a membrane excursion that the membrane is shortened in its peripheral region by transversal contraction and is lengthened in its central region. This stroke is the result of exploiting two actions, namely the exploitation of the transversal contraction in the ceramic itself and the curvature of layers adjacent to the composite that dilate differently. Due to the transversal contraction, the stroke of the membrane can be increased by reducing the layer thicknesses and enlarging the length dimensions.

An especially advantageous dynamic action derives when the membrane regions are arranged concentrically relative to one another so that they arc outward button-like when excited. This button-like convexity represents the smallest and most compact geometrical shape that proceeds from a planar layer and expands and closes a cavity. It is dynamically balanced around a surface normal and departs the plane in a torus-shaped chamfer that merges into a lens-shaped segment of a sphere. The required curvature condition changes at the transition line. Accordingly, the electrodes are arranged such or, respectively, the corresponding membrane regions are polarized such and driven via the electrodes that the peripheral region (annulus) shortens but the central region lengthens. The edge of the membrane does not change its slope upon excursion, for which reason it can be firmly clamped. The elastic line essentially corresponds to an excursion under inside pressure. In a further, advantageous embodiment of the invention a plurality of membranes individually activatable independently of one another are arranged on a common substrate surface, whereby the drive lines for the individual membrane regions lead across unpolarized regions of the substrate surface so that no undesired piezoelectric effects appear via these drive lines during driving.

In order to further increase the stroke, the supporting layer can be replaced by a further piezoelectrically excitable layer that is respectively polarized is a direction opposite the first piezoelectrically excitable layer. Nearly a doubling of the stroke thus derives.

An especially simple ink writing head that operates with operational reliability can be fashioned in that every ink channel has three membranes that are connected to one another via a pump channel for the writing fluid allocated to it, these membranes forming a static pump comprising two controllable rotary pistons and a variable cavity. The first membrane region communicates, first, with the ink supply system via a supply channel and, second with the variable cavity and serves as admission valve. The second membrane region is allocated to the variable cavity and a third membrane region is arranged between the cavity and the ink channel as outlet valve. In an advantageous embodiment of the invention, the pump channel that connects the membranes comprising parting webs in the region of the membranes fashioned as valves, these parting webs interacting with the membrane surfaces such that, after the excusrion of the membrane surfaces, the pump channel opens via the parting webs and, in the non-deflected condition of the membrane surfaces, the pump channel is interrupted in the region of the parting webs via the membrane surfaces.

The parting webs can thereby be fashioned as through webs or can also be fashioned as collar-like elevations having outlet openings or, respectively, admission openings lying therebetween.

Since ink having low viscosity can be used in the ink writing head of the invention, the ink can be filtered considerably better, the penetration of dirt into the ink channels being therewith avoided. It is also additionally possible to electrically expand the transmission crossection for cleaning purposes and to reverse the pump direction. Moreover, the parting web can also be directly cleaned with ultrasound and contaminations can be ground up at the parting web.

Since the transducer elements keep the ink channels closed as long as the transducer elements are not driven, a mechanical closure of the nozzles is not necessary between the writing head and the paper and the drive of such a closure can be eliminated. It is thus possible to greater reduce the distance from the paper, wherewith the print image is less negatively affected by the scatter of the flight speed and of the flight direction of the drops. Since the pressure can be statically impressed on the nozzle, the flight speed can be elevated. A crosstalk between the nozzles is eliminated since there is no flow connection during spraying.

The ejection frequency is not limited by reflections in the channel and is not limited by the crosstalk of neighboring nozzles but is limited only by the intrinsic values of the individual transducer elements. An individual balancing of the transducer elements can be omitted since the coupling of the transducer to the ink ensues far more directly and uniformly.

Since the ink supply system of the invention is independent of static underpressure, it becomes significantly more insensitive, the sensitivity of the ink writing head to acceleration also disappearing therewith.

Air bubbles can be eliminated from the ink channel by static pumping. Empty channels can be filled under electrical control.

The ink reservoir can be stationarily accomodated in the printer without difficulty. Pressure waves from the moving supply hose do not act on the drop formation.

The monitoring of the ink supply is no longer bound to the narrow limits of a static pressure in the reservoir.

The overall writing head can be manufactured in planar technology in an especially simple way. The critical part, namely the piezoceramic, can be tested before the actual assembly.

Figure 2:
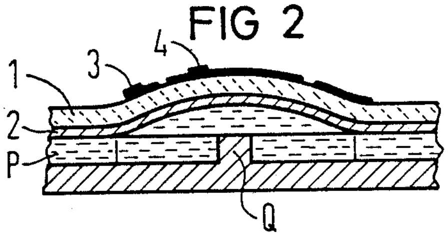
Figure 3:
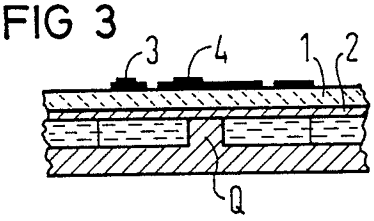
Figure 4:
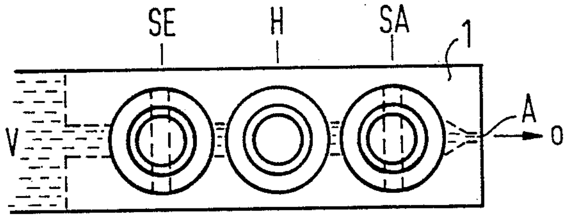
Figure 5:
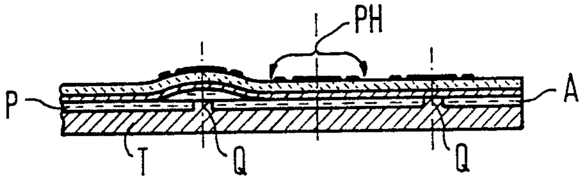
Figure 10:
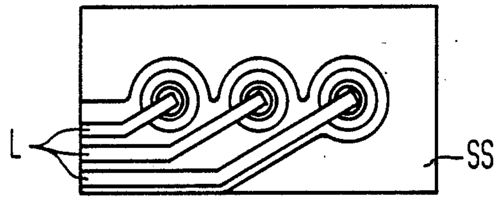
Figure 11:
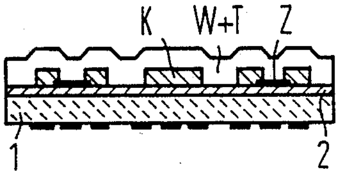
Figure 12:
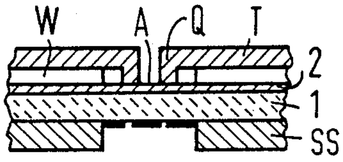

Embodiments of the invention are shown in the drawings and shall be set forth in greater detail below by way of example. Shown are:

FIG. 1 a schematic comparison of the deformation of a membrane plate under inside pressure and a membrane plate having impressed convexity;

FIG. 2 a membrane of the invention in its deflected condition;

FIG. 3 a membrane of the invention in its unexcited condition;

FIG. 4 a static pump composed of three membranes connected to one another, shown in a plan view;

FIG. 5 a static pump of FIG. 4 shown in crossection;

FIGS. 6 through 10 schematic illustrations of the layer format of the ink writing head of the invention;

FIG. 11 a schematic, sectional view of a transducer element comprising collar-shaped parting webs;

FIG. 12 a schematic illustration of the ink writing head of the invention; and

Figure 13:
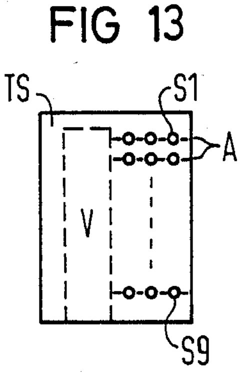

FIG. 13 a schematic illustration of the oblique positioning of the ink writing head in a line printer means.

Figure 14:
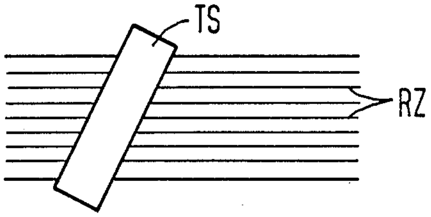

FIG. 14 is a schematic illustration of the oblique position of an ink printing head in a line printing means.

A planar transducer of piezoceramic as shown in FIGS. 2 and 3 is composed of a piezoelectrically excitable layer 1 of piezoceramic that is continuously polarized in one direction and is further composed of a supporting layer 2 of, for example, nickel that is firmly joined to this excitable layer. The electrically drivable membrane formed in this way is driven via corresponding electrodes 3,4, whereby the supporting layer 2 serves as a through electrode to ground and the actual drive electrodes are composed of a peripheral drive electrode 3 and of a central drive electrode 4. These drive electrodes 3 and 4 define membrane regions is the shape of circular areas and, respectively, annular areas that are arranged concentrically relative to one another. When a membrane constructed in this way is then driven such that electrical fields that differ in direction are formed between the electrodes 3 and 4 of the polarized piezoceramic 1 and the common cooperating electrode 2, then the membrane arcs outward in the direction shown in FIG. 2 when the annular electrode 3 causes a contraction of the piezoceramic layer 1 in the region of the annular electrode 3 and a dilation of the piezoceramic layer 1 arises in the region of the electrode 4.

This shall be set forth in greater detail below with reference to FIG. 1.

The smallest and most compact shape that proceeds from a planar surface, requires only weak curvatures and expands and closes a cavity is a button or a dome-like convexity. Such a shape is dynamically balanced around a surface normal and leaves the plane in a torus-shaped chamfer that merges into a lens-shaped segment of a sphere.

Such an ideal shape can then be generated in that a planar, elastic membrane is subjected to a uniform inside pressure. The shape shown at the left-hand side of FIG. 1*a* thereby derives having the slope shown in FIG. 1*b* and a curvature according to FIG. 1*c*, whereby the abscissa is allocated to the radius of the membrane area.

In order to achieve this ideal button shape, the drive electrodes 3 and 4 are fashioned such in combination with the piezoelectrically excitable layer 1 and the supporting layer 2 that serves as electrode to ground that this ideal shape approximately derives given excursion.

To this end, the circular outside electrode 3 is arranged in the outer curvature region of the membrane and is charged with such an electrical field that the piezoelectric layer contracts in this curvature region. The inside electrode 4 arranged concentrically relative thereto is charged with such a field that the central region of the piezoceramic layer 1 dilates. Two effects are thus simultaneously exploited, namely the transversal contraction of the ceramic itself and the curvature of layers adjacent to the composite that expand differently. The radius of curvature up to which planar layers can be arced in this way lies at about 0.1 m through 0.4 m dependent on how thin the layers can be made. The ratio of the electrode areas to one another is then dimensioned such that the desired approximation of the course in FIG. 1*a* derives. This yields a slope according to FIG. 1*b* having the appertaining curvature of FIG. 1*c* (right-hand side of FIG. 1).

As shown in FIGS. 2 through 5, a static pump composed of two controllable rotary pistons SE and SA and of a variable cavity H can be fashioned with such a planar transducer of piezoceramic. To this end, three membrane regions SE,H,SA are fashioned in a ceramic substrate. A pump channel P is fashioned in a carrier layer T that carries the substrate 1 together with its appertaining supporting layer 2. This pump channel P is in communication with a fluid supply V (FIG. 4). A cross-rib Q is applied in the pump channel in the region of the admission valve SE, the membrane of piezoceramic 1 and supporting layer 2 lying against this cross-rib Q in its unexcited condition and thus closing the channel. In the excited condition corresponding to FIG. 2, the membrane lifts off button-shaped and thus opens the channel P.

The same structure as at the admission valve SE having the cross-rib Q derives at the outlet valve SA having the cross-rib Q there. The membrane region H that is constructed in conformity with the membranes of the admission valves [sic] SE and SA and serves as the actual pump H is situated between the admission valve SE and the outlet valve SA. A pump constructed in this fashion, as shown in FIGS. 4 and 5, can then be driven in an advantageous way, for example via a three-phase current, namely in that the admission valve SE is first opened with a first phase in a pumping step, in that fluid is taken in from the supply V due to excursion of the membrane H, and in that, after the admission valve SE has closed and after the outlet valve SA has opened (third phase), fluid is ejected from the outlet region A by actuation of the actual pump membrane H.

The pump channel can also be fashioned in some other way dependent on the application. Thus, it is also possible to replace the cross-ribs Q by collar-like walls of round admission and outlet openings A that project into the pump channels. In its unexcited condition, the membrane surface then places itself against this collar in a way analogous to that in which it places itself against the cross-rib and thus closes the admission or outlet.

Many arrangements are then possible for such a static pump. In accord with FIG. 13, thus, an ink writing head can be constructed wherein, for example, nine printing jets S1 through S9 are arranged on a single substrate 1. Each of these printing jets is composed of an admission valve SE, of a variable cavity H and of an outlet valve SA. The printing jets S1 through S9 are thereby in communication with the reservoir region V. In order to be able to fashion a writing head having a greater plurality of jets, it is also possible to pack a plurality of substrates 1 with printing jets on top of one another.

In such an ink writing head, the printing jets S1 through S9 are completely functionally separated from the ink supply V. A mechanical closure of the jets between writing head and the paper arranged in front of the writing head can thus be eliminated, as can the drive of this closure since the ink channels are closed by the outlet valves SA as long as these outlet valves SA are not driven. A crosstalk between the jets is eliminated since there is no flow connection during the actual ejection event. The ejection events are thereby not limited by the reflection in the ejection channel and are not limited by the crosstalk between neighboring jets but are only limited by the intrinsic values of the individual printing jets S1 through S9. Air bubbles can be eliminated from the ink channel P by static pumping and empty channels can be refilled.

As shown in FIGS. 6 through 10, the ink writing head of the invention can be manufactured in planar technology in an especially simple way. To this end, according to FIG. 6, a substrate 1 composed of piezoceramic and having a thickness of about 200 μm is first polarized and tested. The piezoceramic 1 is then metallized on both sides by vacuum deposition or sputtering (for example, 50 nm Ti and 500 nm Cu). The supporting layer 2 is then electro-deposited surface-wide. At the same time, the peripheral and central drive electrodes 3 and 4 together with leads L can be generated on the opposite side of the ceramic with the assistance of a photoresist marking (for example, 100 μm Ni).

In order for the button to be able to be separated from the web Q later, a thin intermediate layer Z (for example, 0.2 mm Al or Cu) that is selectively etchable for the remaining structuring is needed in this region. It is vapor-deposited or sputtered and is structured with photolithography etching technique.

The shaping of the channels P can ensue by electrodeposition of a metal layer W between a photoresist structure (for example, 50 μm Ni). After application of a metallic conductive layer over the non-conductive photoresist, the carrier layer T is then electro-deposited surface-wide (for example, 100 μm Ni). However, the channel walls W can also be produced in one step together with the carrier layer T. To that end, a structure K of photoresist or metal (for example, Cu) having the shape of the later channels and cavities is generated on the supporting layer 2. When photoresist is employed, then its surface must be subsequently rendered conductive with a further, thin metal layer. Given employment of metal, the metal of the channel walls [and] carrier layer can be directly electro-deposited (for example, 100 μm Ni) on the structure K and on the remaining, exposed substrate surface 2, FIG. 11.

The structure K of photoresist or metal is then selectively stripped relative to the overall structure and the cross-web Q, finally, is separated from the button by dissolving the intermediate layer.

However, it is also possible to first structure the walls of the channel structure (W) on the thin auxiliary layers (ALU) and to fill an etchable filler into the channels P formed in this way. After application of the carrier layer T, the etchable filler is then removed and the auxiliary layer (Z) is likewise removed, so that the cross-ribs Q can detach from the supporting layer 2 when the substrate 1 arcs up.

In order to facilitate the etched removal of the auxiliary layers or, respectively, of the materials that structure the channels, openings that are closed later can be provided.

In order to prevent a running [sic] of the composite given temperature changes, a further supporting layer SS can be applied on the backside of the ceramic layer 1 outside of the electrodes. It is also possible to generate the lines L for the electrodes 3 and 4 (FIG. 10) simultaneously with the supporting layer, i.e. of the same material and in the same thickness.

Instead of the described cross-rib Q, it is also possible according to FIG. 12 to fashion the cross-rib circular, wherewith the axis of the outlet nozzle A then has a direction perpendicular to the substrate surface 1. It is thus also possible to construct the ink writing head such that the outlet nozzles A are arranged at the end face at the substrate or such that they are arranged at the substrate surface. Which is the more advantageous arrangement depends on the application. As is also shown in FIG. 14, the ink writing head can also be inclined at an angle relative to the scan line in order to increase the division density between the scan line RZ.

We claim:

1. Ink writing head comprising ink ejection channels (P) and piezoelectric transducer elements (3,4) allocated to the ink ejection channels (P), said transducer elements being supplied with writing fluid via supply lines (V), whereby said transducer elements (3,4) contain an electrically drivable membrane having a first piezoelectrically excitable layer (1) and a supporting layer (2) firmly joined to this excitable layer and the ink is ejected from the ink ejection channels (P) due to excursions of the membrane, characterized in that the piezoelectrically excitable layer (1) comprises a peripheral region (3) and a central region (4) that are driven such for generating an excursion of the membrane needed for writing operation that the peripheral region (3) is shortened by transversal contraction and the central region (4) is lengthened by dilation.

2. Ink writing head according to claim 1, characterized in that the piezoelectrically excitable layer (1) that is continuously polarized in one direction comprises a through electrode (2) to ground on its one side and comprises a first drive electrode (3) allocated to the peripheral region and a second drive electrode (4) allocated to the central region on its other side, whereby the peripheral region and the central region are charged with different electrical fields for driving.

3. Ink writing head according to claim 1, characterized in that the piezoelectrically excitable layer comprises a through electrode (2) to ground on its one side and comprises a common drive electrode on its other side, whereby the peripheral regions and the central region are differently polarized.

4. Ink writing head according to claim 1, characterized in that the membrane regions (3,4) of a membrane are arranged concentrically relative to one another and arc outward button-like when driven.

5. Ink writing head according to claim 1, characterized in that a plurality of membrane regions (3,4) individually activatable independently of one another are arranged on a common substrate surface (1).

6. Ink writing head according to claim 5, characterized in that the drive lines (L) for the individual membrane regions lead across unpolarized regions of the membrane surface.

7. Ink writing head according to claim 1, characterized in that the supporting layer (2) is replaced by a further piezoelectrically excitable layer that is respectively polarized in a direction opposite the first piezoelectrically excitable layer.

8. Ink writing head according to claim 1, characterized in that the membrane mechanically closes the ink channels in its non-activated condition.

9. Ink writing head according to claim 1, characterized in that every ink channel has three membrane regions that are connected to one another via a pump channel (P) for the writing fluid allocated to it, said three membrane regions forming a static pump having two controllable rotary pistons (SE, SA) and a variable cavity, whereby the first membrane region (SE) is connected, first, to the ink supply system (V) via a supply channel and, second, to the variable cavity (H) and is arranged as a admission valve between the supply channel and the cavity, the second membrane region (PH) effects the pump stroke with its variable cavity, and a third membrane region (SA) is arranged as outlet valve between the cavity (PH) and the outlet region (A) of the ink channel.

10. Ink writing head according to claim 9, characterized in that the pump channel (P) connecting the membrane regions comprises parting webs (Q) in the region of the membrane surfaces fashioned as valves, said parting webs cooperating with the membrane surfaces such that, after outward arcing of the membrane surfaces, the pump channel opens via the parting webs and, in the non-deflected condition of the membrane surfaces, the pump channel is interrupted in the region of the parting webs (Q) via the membrane surfaces.

11. Ink writing head according to claim 1, characterized in that a plurality of membrane surfaces are arranged over one another in the ink writing head.

12. Ink writing head according to claim 1, characterized in that the ink writing head (TS) is inclined relative to the scan lines in order to diminish the division between the scan lines (RZ).

13. Method for the manufacture of an ink writing head according to claim 5, characterized in that a thin layer of piezoceramic is used as substrate (1), the required structure of the ink head being galvanoplastically constructed thereon.

14. Method according to claim 13, characterized in that the piezoeceramic layer (1) is polarized before the galvanoplastic structuring.

15. Method according to claim 13, characterized in that the piezoceramic (1) is metallized on both sides by vapor-deposition or sputtering, drive electrodes (3, 4) as well as the leads (Z) appertaining thereto are subsequently photolithographically-voltaically structured on the one side thereof; in that, simultaneously, the supporting layer (2) is electro-deposited on the other side of the piezoceramic; and in that one or more thin auxiliary layers are then generated and structured on the supporting layer (2), the membrane being capable of being separated from the cross-rib (Q) in the channel structure (P) on the basis of the later dissolving of said auxiliary layers.

16. Method according to claim 15, characterized in that the walls (W) of the channel structure (P) are electro-deposited over the supporting layer (2) and the thin auxiliary layer (Z) between photoresist structures; in that a thin metal layer is applied over the photoresist structures and over the channel wall layer; in that the carrier layer (T) is electro-deposited thereon surface-wide; and in that the photoresist is selectively dissolved out.

17. Method according to claim 16, characterized in that openings that are later closed are provided for facilitating the etched removal of the auxiliary layers or, respectively, of the materials that structure the channels (P).

18. Method according to claim 15, characterized in that a structure (K) of the photoresist or metal having the shape of the channels is generated over the supporting layer (2) and over the thin auxiliary layers (Z); in that, if the structure (K) is composed of photoresist, a thin metal film is applied thereover; in that the channel walls (W) and the carrier layer (T) are then electro-deposited in common over the supporting layer (2) and over the structure (K) as a topographic layer; and in that, finally, the structure (K) is selectively dissolved out.

19. Method according to claim 15, characterized in that the walls (W) of the channel structure for the acceptance of the writing fluid are structured on the thin auxiliary layers; in that the channels (P) formed in this way are then filled with an etchable filler and a cover layer (T) is applied to the channels (P) filled in this way; and in that the filler is then removed.

* * * * *